US007921063B1

(12) United States Patent
Quinlan

(10) Patent No.: US 7,921,063 B1
(45) Date of Patent: *Apr. 5, 2011

(54) EVALUATING ELECTRONIC MAIL MESSAGES BASED ON PROBABILISTIC ANALYSIS

(76) Inventor: Daniel Quinlan, San Bruno, CA (US)

( * ) Notice: Subject to any disclaimer, the term of this patent is extended or adjusted under 35 U.S.C. 154(b) by 907 days.

This patent is subject to a terminal disclaimer.

(21) Appl. No.: 11/803,846

(22) Filed: May 15, 2007

Related U.S. Application Data

(60) Provisional application No. 60/801,330, filed on May 17, 2006.

(51) Int. Cl.
*G06F 15/18* (2006.01)
*G06N 3/00* (2006.01)
(52) U.S. Cl. .............. 706/12; 705/76; 709/242
(58) Field of Classification Search .............. 709/242
See application file for complete search history.

(56) References Cited

U.S. PATENT DOCUMENTS

| 2003/0051026 | A1* | 3/2003 | Carter et al. ............ 709/224 |
| 2006/0031319 | A1* | 2/2006 | Nelson et al. ............ 709/206 |
| 2007/0078936 | A1 | 4/2007 | Quinlan |
| 2010/0010940 | A1* | 1/2010 | Spyropoulos et al. ...... 706/12 |

OTHER PUBLICATIONS

J. Goodman et al., "Fighting Spam with Statistics," published by Microsoft Corporation, undated, downloaded Jul. 22, 2008, 6 pages.

* cited by examiner

*Primary Examiner* — Donald Sparks
*Assistant Examiner* — Kalpana Bharadwaj
(74) *Attorney, Agent, or Firm* — Hickman Palermo Truong & Becker LLP

(57) ABSTRACT

A computer system can evaluate electronic messages based on probabilistic analysis, including Bayesian analysis. In one embodiment, a data processing system comprises logic configured for perform training a probabilistic filter using first properties of one or more first network resource identifiers obtained from a whitelist; training the probabilistic filter using second properties of one or more second network resource identifiers obtained from a blocklist; testing third properties of a third network resource identifier using the probabilistic filter, resulting in creating a probability output; and adding the third network resource identifier to the blocklist when the probability output is greater than a specified threshold. The blocklist can be communicated to messaging gateways in the field for local use in evaluating messages that contain spam or other threats.

32 Claims, 6 Drawing Sheets

US 7,921,063 B1

EVALUATING ELECTRONIC MAIL MESSAGES BASED ON PROBABILISTIC ANALYSIS

PRIORITY CLAIM

Cross-Reference to Related Application

This application claims the benefit under 35 U.S.C. 119(e) of prior provisional application 60/801,330, filed May 17, 2006, the entire contents of which are hereby incorporated by reference for all purposes as if fully set forth herein.

TECHNICAL FIELD

The present disclosure generally relates to network data communications. The disclosure relates more specifically to processing electronic mail messages that are unwanted or associated with spam, viruses or other threats.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Senders of electronic mail messages that are unwanted or unsolicited ("spam"), or that contain viruses or other threats such as "phishing" attacks often use tactics to conceal the fact that the messages are unwanted or unsolicited, contain viruses or other threats. The message may have a subject line, sender name ("From:" value), and other elements that appear legitimate. In addition, the message may take steps to make it difficult for electronic systems to determine the intent of the message. However, the message may contain hyperlinks, uniform resource indicators (URIs), uniform resource locators (URLs), or other network resource identifiers that are associated with spam, viruses or other threats. When the user selects ("clicks on") a hyperlink in such a message, the user's browser directs the user to a harmful or undesired page that delivers a virus, adware, or spyware, or attempts to induce the user into disclosing personal information or financial information, or leads to undesired content such as advertisements or pornography.

Other times, the URLs access executable code or scripts that report back to the spam engine the "successful" delivery of a spam message. Still other times, the URLs are intended for click-through marketing of whatever commercial products the spam relates to.

Consequently, when the message is received, based on typical analysis of the message content, threat detection systems and other analytical tools often cannot determine whether the message is spam or associated with threats.

DETAILED DESCRIPTION

Figure 1:
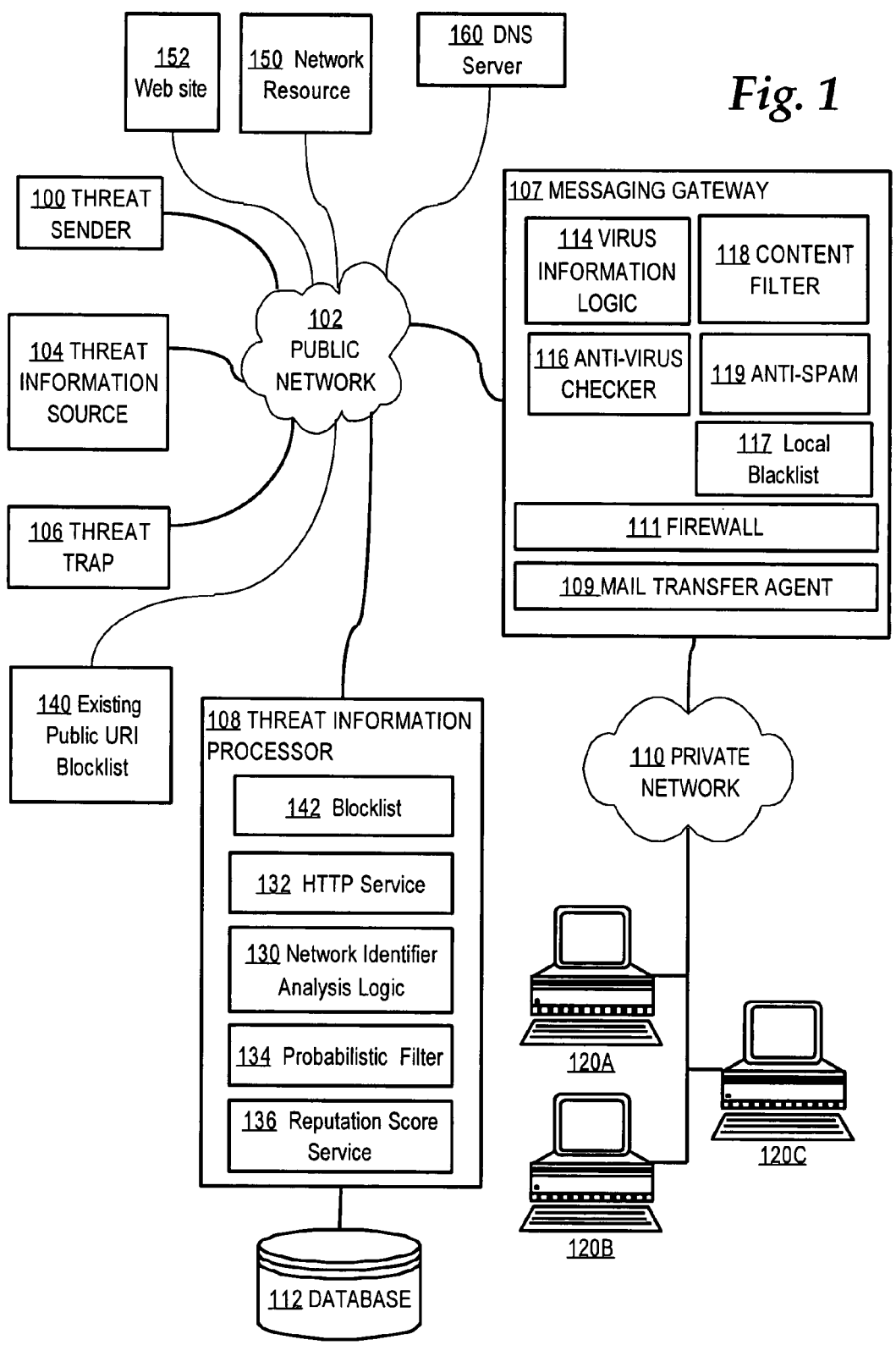
FIG. 1 is a block diagram that illustrates an example network arrangement that may be used to implement an embodiment.

A method and apparatus for detecting undesired electronic mail messages based on probabilistic analysis of referenced resources are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
    2.0 Structural and Functional Overview
        2.1 Example Structural Arrangement
        2.2 Functional Overview
        2.3 Plug-In Embodiment
        2.4 Red List Embodiment
    3.0 Implementation Mechanisms—Hardware Overview
    4.0 Extensions and Alternatives

1.0 General Overview

A computer system can evaluate electronic messages based on probabilistic analysis, including Bayesian analysis. In one embodiment, a data processing system comprises logic configured for perform training a probabilistic filter using first properties of one or more first network resource identifiers obtained from a whitelist; training the probabilistic filter using second properties of one or more second network resource identifiers obtained from a blocklist; testing third properties of a third network resource identifier using the probabilistic filter, resulting in creating a probability output; and adding the third network resource identifier to the blocklist when the probability output is greater than a specified threshold. The blocklist can be communicated to messaging gateways in the field for local use in evaluating messages that contain spam or other threats.

In an embodiment, the whitelist comprises network resource identifiers that are not associated with spam or threats, and wherein the blocklist comprises network resource identifiers that are associated with spam or threats. In an embodiment, the specified threshold indicates spam or threats. In an embodiment, the training comprises generating lists of one or more of the properties from the network resource identifiers.

In one embodiment, the logic when executed is further operable to perform extracting a domain name portion of the third network resource identifier; retrieving one or more MX records for the domain name portion from a domain name system (DNS) server; retrieving network address records for each mail exchange that is identified in the one or more MX records; determining an average reputation score for the network address records; adding the third network resource identifier to the blocklist when the average reputation score is less than a specified threshold. In one feature, the logic when executed is further operable to perform determining a blocklist status for the network address records, and adding the third network resource identifier to the blocklist when the blocklist status indicates that network addresses in the network address records are blocked.

In another embodiment, the logic when executed is further operable to perform extracting a domain name portion of the third network resource identifier; retrieving one or more NS records for the domain name portion from a domain name system (DNS) server; retrieving network address records for each mail exchange that is identified in the one or more NS records; determining an average reputation score for the network address records; adding the third network resource identifier to the blocklist when the average reputation score is less than a specified threshold. In one feature, the logic when executed is further operable to perform determining a blocklist status for the network address records, and adding the third network resource identifier to the blocklist when the blocklist status indicates that network addresses in the network address records are blocked.

In an embodiment, the logic when executed is further operable to communicate the blocklist to one or more messaging gateways over a data network.

In an embodiment, one or more messaging gateways are coupled to the processor over a data network; the logic when executed is further operable to communicate the blocklist to the one or more messaging gateways over the data network; each of the one or more messaging gateways has second logic encoded in one or more media for execution and when executed operable to perform receiving a message containing one or more hyperlinks or network resource identifiers; searching the received blocklist to determine whether the one or more hyperlinks or network resource identifiers are in the blocklist; modifying a spam score value of the message based on whether the one or more hyperlinks or network resource identifiers are in the blocklist.

In other aspects, the invention encompasses an electronic mail server, other computer apparatus, a method and a computer-readable medium.

2.0 Structural and Functional Overview 2.1 Example Structural Arrangement

FIG. 1 is a block diagram that illustrates an example network arrangement that may be used to implement an embodiment. For purposes of illustrating a clear example, parts of the description herein refer to spam messages. However, other embodiments may work with messages that contain or relate to any form of message-borne threat or problem, such as spam or unsolicited messages, messages containing "phishing" attacks or other deceptive or harmful content. Thus, the broad approaches herein are not limited to systems that work with spam. Further, embodiments can test "ham" messages and provides an output indicating that such messages are not spam or not associated with threats.

Referring now to FIG. 1, a threat sender 100, whose identity and location are typically unknown, is directly or indirectly coupled to a public network 102 and sends a message, typically in an electronic message or email, to the public network. The message is addressed to a plurality of recipients or destinations such as accounts of users of computers 120A, 120B, 120C in private network 110, threat information source 104 and threat trap 106. The message comprises spam, contains a threat such as a virus, or contains a network identifier of a network resource that presents spam content or is malicious or harmful.

Threat information source 104 comprises a network-accessible source of message signatures, blacklists, whitelists, or other information that identifies messages or senders of messages that are spam or harmful. Additionally or alternatively, threat information source 104 may comprise the SpamCop information service that is accessible at domain "spamcop.net" on the World Wide Web, or users of the SpamCop service. SpamCop includes a database for tracking URLs, hostnames and IP addresses in association with spam, ham and probabilistic scores.

Threat information source 104 may comprise services or databases owned, operated or managed by one or more Internet service providers or other high-volume mail receivers.

In another alternative embodiment, as a supplement to the automatic approaches herein, threat information source 104 may comprise the manual review of data that is obtained by information services consultants or analysts, or external sources. For example, a human administrator monitoring alerts from anti-spam vendors, anti-virus vendors, third-party vendors, anti-spam mailing lists or virus mailing lists, spam-trap or threat trap data and other sources can detect spam well in advance of when updates to anti-spam software or processing rules are published in most cases.

Threat trap 106 is an email address, account or mailbox used exclusively to collect information about email messages that comprise spam or relate to threats. For purposes of illustrating a simple example, FIG. 1 shows only two destinations in the form of threat information source 104 and threat trap 106, but in a practical embodiment there may be any number of such sources of spam information.

The threat sender 100 may obtain network addresses of computers 120A, 120B, 120C and threat trap 106 from public sources, purchased email address lists, online postings, etc.

A threat information processor 108 is communicatively coupled to public network 102 and can receive information from the threat information source 104 and threat trap 106. Threat information processor 108 implements certain functions described further herein including collecting spam and threat information from threat information source 104 and threat trap 106, generating spam and threat information, and storing the spam and threat information in a database 112.

A network resource 150 and web site 152 are coupled to public network 102. Network resource 150 may comprise network-accessible executable computer program code, scripts, or other software elements. Network resource 150 also may comprise a web site 152, a file server, or any other network-accessible information resource. In various embodiments, there may be any number of network resources 150 and web sites 152 coupled to network 102. In this description, the term "network resource identifier" broadly refers to any data that identifies a network resource of any kind; thus a "network resource identifier" may be a URL, URI, hyperlink, domain name, hostname, etc.

One or more domain name service (DNS) servers 160 are coupled to public network 102. Each DNS server 160 stores DNS records that can be used to resolve domain names into network addresses such as IP addresses, names of mail exchange (MX) servers associated with the domain names, name server records, etc.

An existing public URI blocklist 140 is coupled to public network 102. Blocklist 140 generally comprises a list of uniform resource indicators (URIs) that have been advertised in spam messages. In an embodiment, blocklist 140 comprises is a collection of other block lists, all targeting domains which are found in spam messages. Information at blocklist 140 can be accessed using a DNS lookup, which requires Internet connectivity and has relatively long latency for results. In an embodiment, because blocklist 140 comprises a collection of lists, each output entry from blocklist 140 is tagged with a bitmask identifying which list or lists the domain appeared on.

A messaging gateway 107 is coupled, directly or indirectly through a firewall 111 or other network elements, between public network 102 and a private network 110 that includes a plurality of end stations 120A, 120B, 120C. Messaging gateway 107 may be integrated with a mail transfer agent 109 that processes email for private network 110, or the mail transfer agent may be deployed separately. For example, an IronPort Messaging Gateway Appliance (MGA), such as model C60, C30, C10, X1000, etc., commercially available from IronPort Systems, Inc., San Bruno, Calif., may implement mail transfer agent 109, firewall 111, and the functions described herein for messaging gateway 107.

In an embodiment, messaging gateway 107 includes virus information logic 114 for obtaining virus outbreak information from threat information processor 108 and processing messages destined for end stations 120A, 120B, 120C according to policies that are set at the messaging gateway. Such virus information logic may be integrated with a content filter function of messaging gateway 107.

Messaging gateway 107 may also include an anti-virus checker 116 such as ClamAV, a content filter 118, and anti-spam logic 119 such as a SpamAssassin module. The anti-virus checker 116 may comprise, for example, Sophos anti-virus software. The content filter 118 provides logic for restricting delivery or acceptance of messages that contain content in a message subject or message body that is unacceptable according to a policy associated with private network 110. The anti-spam logic 119 scans inbound messages to determine if they are unwanted according to a mail acceptance policy, such as whether the inbound messages are unsolicited commercial email, and the anti-spam logic 119 applies policies to restrict delivery, redirect, or refuse acceptance of any unwanted messages. Anti-spam logic may communicate with a local blacklist that identifies prohibited senders, or identifiers of network resources (e.g., network resource 150, web site 152) that have been advertised in spam messages.

As used herein, the term "mail server" includes a messaging gateway 107, a mail transfer agent, a mail exchange, and any other data processing unit, server, software or system that receives and forwards electronic mail messages.

Private network 110 may be an enterprise network associated with a business enterprise or any other form of network for which enhanced security or protection is desired. Public network 102 and private network 110 may use open standard protocols such as TCP/IP for communication.

Threat information source 104 may comprise another instance of a messaging gateway 107 that is interposed between public network 102 and another private network (not shown for clarity) for purposes of protecting that other private network. In one embodiment, threat information source 104 is an IronPort MGA.

Threat trap 106 is associated with one or more email addresses or email mailboxes associated with one or more domains. Threat trap 106 is established for the purpose of receiving unsolicited email messages, or "spam," for analysis or reporting, and is not typically used for conventional email communication. For example, a spamtrap can be an email address such as "dummyaccountforspam@mycompany.com," or the spamtrap can be a collection of email addresses that are grouped into an MX type DNS record for which received email information is provided. Mail transfer agent 109, or the mail transfer agent of another IronPort MGA, may host threat trap 106.

In an embodiment, threat information source 104 generates and provides information to threat information processor 108 for use in managing computer virus outbreaks, and the threat information processor 108 can obtain information from threat trap 106 for the same purpose. For example, threat information source 104 generates counts of received messages that have suspicious attachments, and provides the counts to threat information processor 108, or allows an external process to retrieve the counts and store them in a specialized database. Messaging gateway 107 also may serve as a virus information source by detecting messages that have indications that are associated with viruses or that are otherwise suspicious, creating a count of suspicious messages received in a particular time period, and periodically providing the count to threat information processor 108.

As a specific example, the functions described herein may be implemented as part of a comprehensive message data collection and reporting facility, such as the SenderBase service from IronPort Systems, Inc. In this embodiment, threat information processor 108 can retrieve or receive information from threat information source 104 and threat trap 106, generate reputation scores for senders of messages that are determined to be spam by anti-spam logic 119, or have suspicious attachments, or virus indicators as indicated by anti-virus checker 116, and update database 112 with the reputation scores for later retrieval and use by virus information logic 114 and anti-spam logic 119 of messaging gateway 107.

Threat information processor 108 comprises one or more servers, systems or services that analyze messages and generate information that can be used by messaging gateway 107 and other messaging gateways that are deployed in private networks or coupled to public network 102. Threat information processor 108 can include or be communicatively coupled to a threat operation center (TOC), a receiving virus score (RVS) processor, or both. The TOC and RVS processor can be separate from threat information processor 108 but communicatively coupled to database 112 and public network 102. The TOC can be implemented as a staffed center with personnel available 24 hours a day, 7 days a week to monitor the information collected by threat information processor 108 and stored in database 112. The personnel staffing the TOC can take manual actions, such as analyzing new information from threat information source 104, reviewing messages received at threat trap 106, creating anti-spam rules, creating anti-virus rules, issuing virus outbreak alerts, updating the information stored in database 112, publishing virus outbreak information so that messaging gateway 107 can access the virus outbreak information, and manually initiating the sending of virus outbreak information to that messaging gateway and other messaging gateways.

Figure 2A:
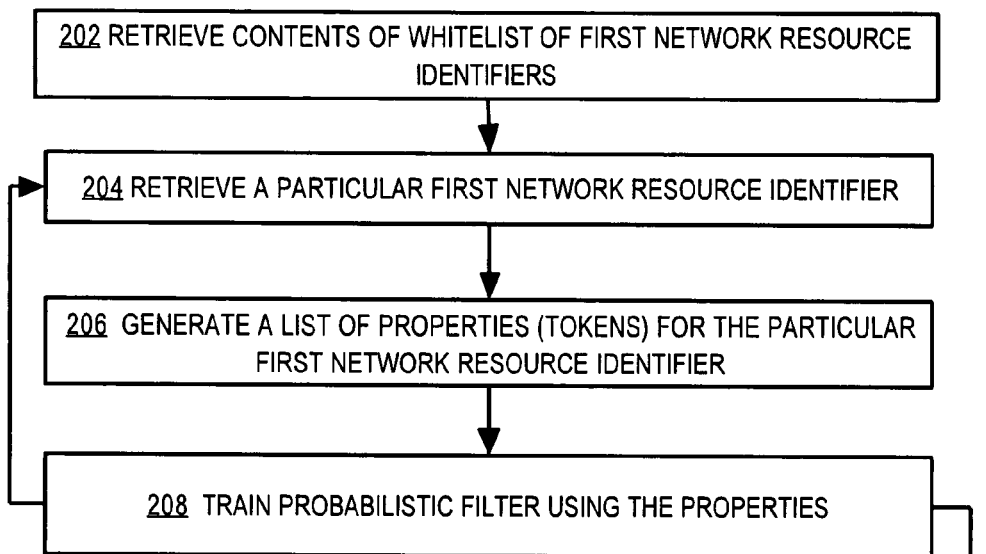
FIG. 2A is a flow diagram that illustrates a high level overview of one embodiment of training a probabilistic filter based on network resource identifiers in received messages.
Figure 2A:
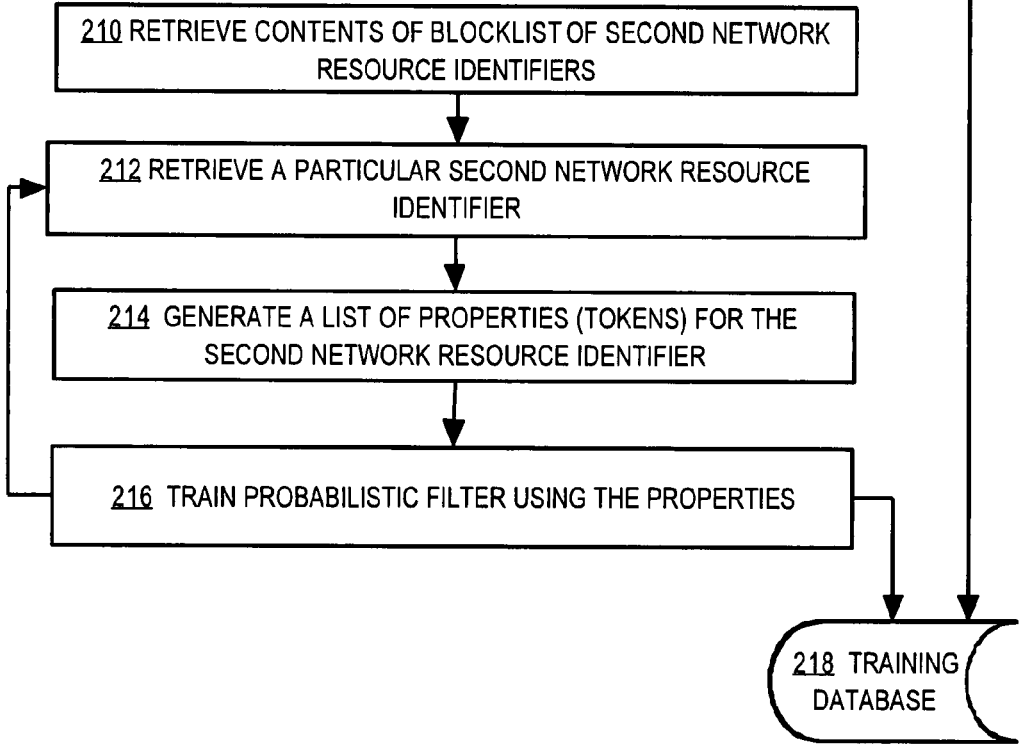
Figure 2B:
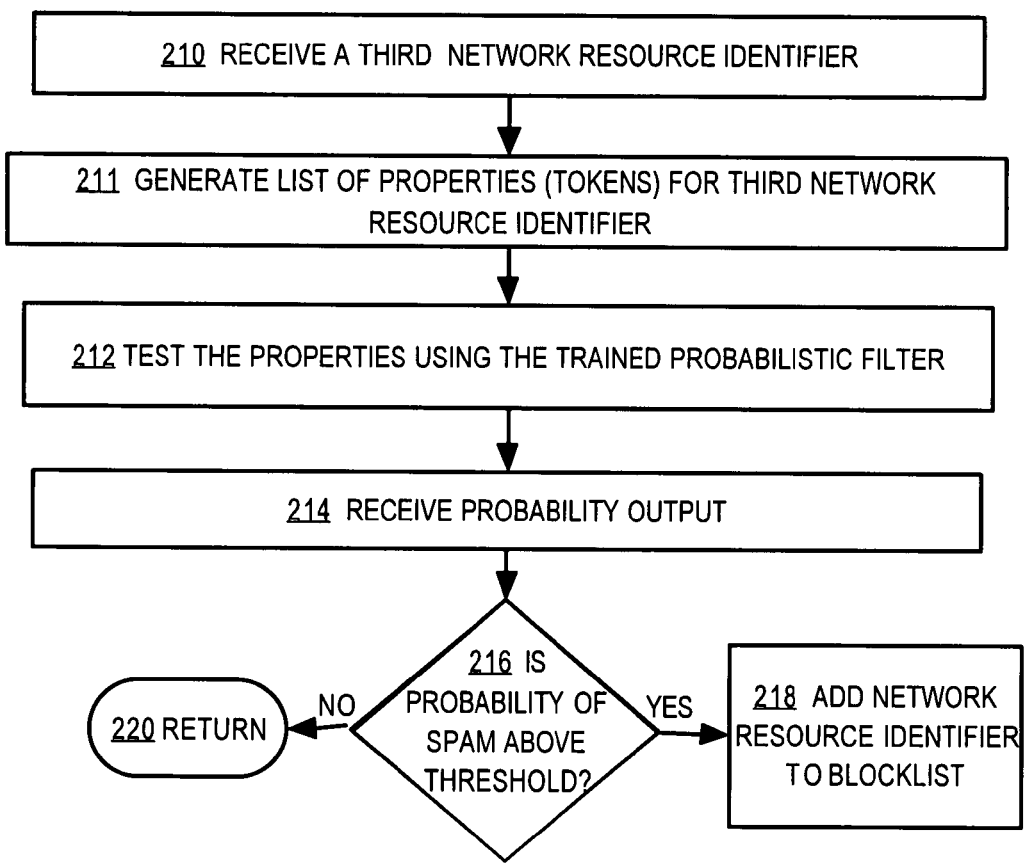
FIG. 2B is a flow diagram that illustrates a high level overview of one embodiment of testing whether received messages are spam or associated with threats.
Figure 2C:
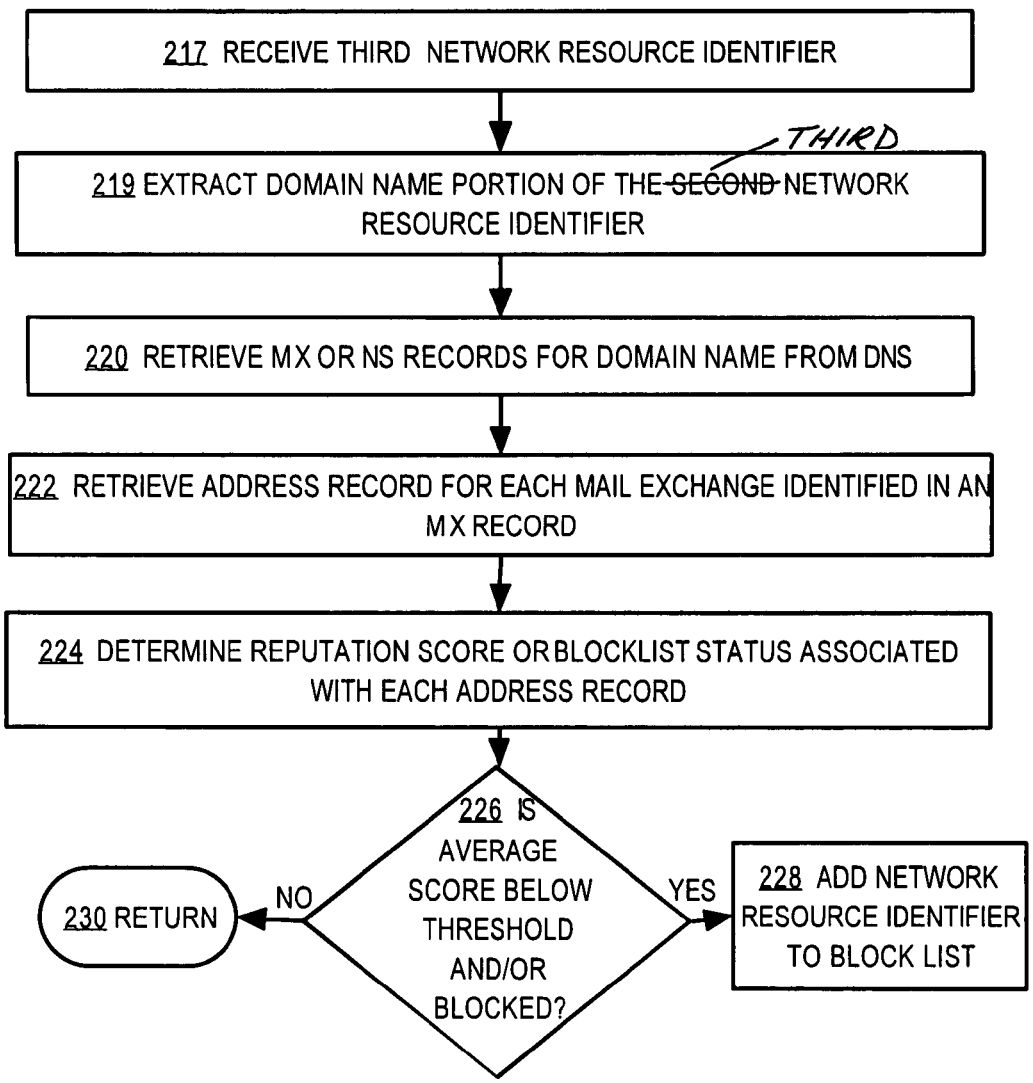
FIG. 2C is a flow diagram that illustrates a high level overview of one embodiment of determining whether to add a network resource identifier to a block list.
Figure 3:
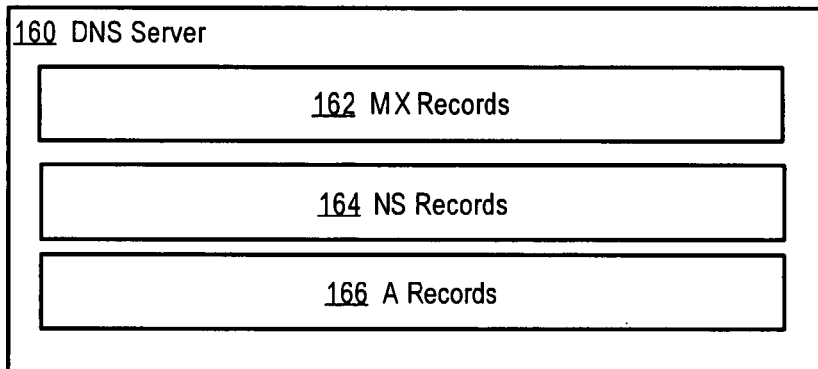
FIG. 3 is a block diagram that illustrates records in a domain name system (DNS) server.

In an embodiment, threat information processor 108 includes network identifier analysis logic 130, which comprises one or more computer programs or other software elements that implement the functions described herein in connection with FIG. 2A-FIG. 3.

In an embodiment, threat information processor 108 includes, or receives information from, one or more trusted blacklists that compile copies or attributes of messages that are known to comprise spam or known to bear threats. Threat information processor 108 may host the blacklists, query external blacklists, or obtain blacklist information through a messaging protocol.

In certain embodiments, database 112 is termed a corpus, and comprises a database of the threat information processor 108 that contains messages that have been definitively classified as spam or not, containing viruses or not, or otherwise classified with respect to other specific threats. Thus, the corpus represents a trusted repository of historical message information that can be used to determine rules or other criteria that indicate whether future messages are spam or contain threats. Messages enter the corpus from automated sources such as threat trap 106 and from reports from messaging gateway 107. Messages also enter from human classification systems; thus, an analyst may receive a message or URL and determine that the message or URL should be added to a whitelist or blacklist in database 112. The corpus also may use avatars to go into the public network 102 and obtain messages for classification.

In an embodiment, database 112 may store the following attribute values for messages:

| Attribute | Source | Notes |
|---|---|---|
| source | header | |
| date | header | |
| sender | header | |
| from | header | |
| recipient/to | header | |
| cc | header | |
| reply-to | header | |
| subject | header | |
| content type | header | |
| message id | header | Value of the Message-ID header |
| mail agent | header | |
| attachments | header/ body | |
| sbrs score | queried | The SBRS score for the connecting IP address is queried during message insertion using the connecting IP address. |
| sbrs score timestamp | computed | Set at the time SBRS is queried for the score. |
| sbrs ruleset | computed | Which SBRS rules (reverse-generated from the bitmask) contributed to the reputation score. |
| connecting ip | computed | Taken from the X-Spam-Untrusted-Relays header. This header is computed by looking backwards at the "hops" until we cross a network boundary. If that doesn't work, use the first "untrusted" IP address in the received headers. |
| checksum | computed | Used for uniqueness determination. Computed from first N bytes of message body using SHA1, where N = min(1024, message body length/2). |
| connecting ip country | queried | Taken from the X-Spam-RBL header. This header is taken directly from a TXT record query. |
| suspected category | computed | Computed using the X-Spam-Status and X-ClamAV-Status headers. If ClamAV reports the message as a virus, then it is "virus". If the SpamAssassin score is less than the configured suspected ham threshold for the given source, then the message is "ham" (a message not known to be spam, but not necessarily fully trusted). If the SpamAssassin score is greater than the configured suspected spam threshold for the given source, then it is "spam". If no specific thresholds exist for a given source, the default thresholds are used. Otherwise, it is "unknown". |
| category | set/ computed | If message is manually submitted with a category, that category is used. Otherwise, it is computed using the same algorithm as suspected category, but with the configurable thresholds for "ham" and "spam" rather than "suspected ham" and "suspected spam". |
| blowback | set | A corpus administrator must manually set this attribute. It defaults to False. |
| bounce | set | A corpus administrator must manually set this attribute. It defaults to False. |
| phishing | set/ computed | If the X-ClamAV-Status header determines the message to be a phishing attack, then it is True. Otherwise, a corpus administrator may set the value manually. It defaults to False. |
| virus rescan | computed | Set to True if the virus status of a message is unknown. Set to False otherwise. |
| virus score | computed | Computed using ClamAV. |
| virus score timestamp | computed | Set each time a message is (re-)scanned using ClamAV. |
| virus ruleset | computed | Which viruses were found. |
| spam rescan | computed | Set to True if either the spam status of a message is unknown or if any of the X-Spam headers necessary for other critical attributes are not present during the last scan. |
| spam score | computed | Computed using stock SpamAssassin. |
| spam score timestamp | computed | Set each time a message is (re-)scanned using ClamAV. |
| spam ruleset | computed | Which spam rules contributed to the "spaminess" score. |
| languages | computed | Computed using SpamAssassin language-detection functionality. |
| audits | computed | Set each time any message attribute is changed. Tracks what was changed, when it changed and who was responsible. |

In an embodiment, threat information processor 108 comprises a blocklist 142. In one embodiment, blocklist 142 may be a locally managed copy or mirror of public sender URI blocklist 140. Mirroring the blocklist 140 ensures that threat information processor 108 has URI blocklist information available continuously, even if blocklist 140 experiences a network outage or failure. In an embodiment, blocklist 142 may be integrated into database 112.

In an embodiment, threat information processor 108 comprises an HTTP service 132, which can issue HTTP requests to obtain copies of network resource 150, information from web site 152, or other network accessible information that is stored in HTTP servers.

In an embodiment, threat information processor 108 comprises a reputation score service 136, which can determine reputation score values for messages stored in database 112, and which can update the database with the score values dynamically as new messages are received. Reputation score values represent whether a message sender or message element is associated with spam messages or messages containing threats, based on past messages that the sender is known to have sent, or based on past messages containing the message element. In one embodiment, reputation score values range from (−10), indicating a poor reputation or frequent and consistent sending of spam or messages with threats, to (+10), indicating a good reputation.

In an embodiment, threat information processor 108 comprises one or more training databases or probabilistic filters 134 implemented in software components. Additionally or alternatively, network identifier analysis logic 130 and probabilistic filter 134 may be implemented as part of anti-spam logic 119 within the messaging gateway 107, or in the form of a plug-in software component for the anti-spam logic of the messaging gateway. Probabilistic filters 134 may be Bayesian filters. The use of probabilistic filter 134 is described further in the next section.

2.2 Functional Overview

In general, one embodiment of a method of processing electronic messages includes receiving a message, identifying one or more network resource identifiers in the message, establishing a network connection to the resources that are referenced by the network resource identifiers, retrieving the referenced resources, evaluating the referenced resources, and determining whether the message contains a threat or represents spam based on the referenced resources.

In one embodiment, the resources are subjected to probabilistic analysis such as Bayesian analysis to determine if they are associated with spam senders. Generally, Bayesian analysis is a statistical procedure that endeavors to estimate parameters of an underlying distribution based on the observed distribution. The analysis begins with a "prior distribution" which may be based on any relevant data, including an assessment of the relative likelihoods of parameters or the results of non-Bayesian observations. In practice, it is common to assume a uniform distribution over the appropriate range of values for the prior distribution.

Given the prior distribution, a process collects data to obtain the observed distribution. Then the process calculates the likelihood of the observed distribution as a function of parameter values, multiplies this likelihood function by the prior distribution, and normalizes the result to obtain a unit probability over all possible values, termed the posterior distribution. As a result, the mode of the distribution is the parameter estimate, and "probability intervals" (the Bayesian analog to confidence intervals) can be calculated using the standard procedure. In Bayesian analysis the validity of the result depends on the validity of the prior distribution, which cannot be assessed statistically.

In another approach, hostname references in an email message are resolved to an IP address using, e.g., a DNS lookup. Both of these approaches may be used to identify network addresses, e.g., IP addresses, which should be added to blacklists maintained in the database 112 or updated into the blocklist 142.

In another approach, hostnames extracted from URLs in the body of messages are mapped to IP addresses (e.g., using DNS). The resulting IP addresses are looked up in one or more blacklists. Concurrently, reputation scores are generated, and the combination of a low reputation score with an indication that the IP addresses are blacklisted is used to determine whether an associated URL should be blacklisted also.

This approach can be applied to all messages that are in the corpus, regardless of whether the messages previously have been determined to be spam.

In another approach herein messages are received and stored in the corpus. The messages are manually reviewed and marked as ham or spam. One or more URLs referenced in the messages are identified, and one or more hostnames are extracted from the URLs. An agent retrieves web pages for the URLs in the message body. The agent may lookup the domain name registrar "whois" record for the domain, and may retrieve a root page at the extracted domain name. Precautions may be taken to avoid retrieving the same page too often, which may signal the owner or operator of the web server that it is under investigation by an anti-spam service.

The retrieved data is tokenized, and the tokens are used to train a probabilistic spam-detecting engine or filter. As a result, a probabilistic filter becomes trained in recognizing which messages represent spam, based on the presence of certain tokens. For example, spammers may use similar appearing domain names in repeated spam campaigns, or a web page retrieval operation will yield an HTTP 404 error (page not found), which can occur when the spammer is sending false URLs or has not yet established a web page at the indicated URL, or content in the web pages may be attempting to advertise products that are known to be associated with spam sources.

After the training phase, newly received messages are processed by the probabilistic filter, and IP addresses associated with those messages that result in a high probabilistic score are blacklisted.

In one embodiment, messaging gateway 107 periodically queries threat information processor 108 to request anti-spam updates for use in anti-spam logic 119. The threat information processor 108 creates a URL blacklist formed from blocklist 142 and as internal whitelists and blacklists that are managed in database 112. The resulting URL blacklist is sent to the messaging gateway 107, alone or with other updates for other elements of the messaging gateway.

In one embodiment, the URL blacklist is sent to the messaging gateway 107 as a Perl SDBM file comprising a list of tuples of the form (hostname, bitmask). The list contains hostnames that have not been whitelisted. In use, any list entry that is a "wildcard" whitelist entry for other list entries will trump that entry. For example, suppose that foo.bar.com is blacklisted and "*.bar.com" is whitelisted. As a result, foo.bar.com would not appear in the final blacklist that is sent to the messaging gateway 107. The same result occurs if only "bar.com" is whitelisted.

Figure 2D:
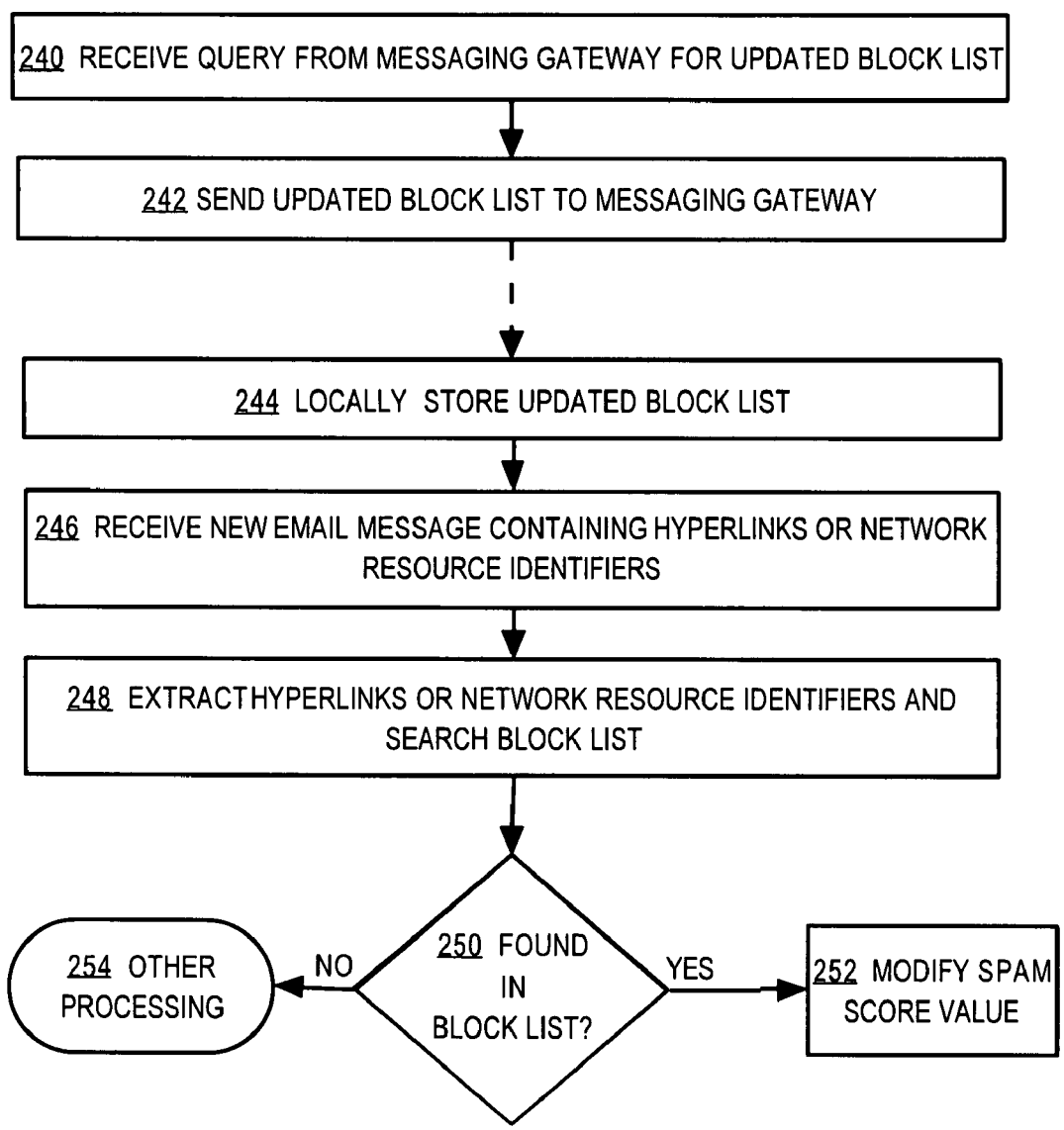
FIG. 2D is a flow diagram that illustrates a high level overview of one embodiment of transferring a block list to a messaging gateway and using the block list to filter messages.

A functional example is now described with reference to FIG. 2A, FIG. 2B, FIG. 2C, and FIG. 2D. FIG. 2A is a flow diagram that illustrates a high level overview of one embodiment of training a probabilistic filter based on network resource identifiers in received messages; FIG. 2B is a flow diagram that illustrates a high level overview of one embodiment of testing whether received messages are spam or associated with threats; FIG. 2C is a flow diagram that illustrates a high level overview of one embodiment of determining whether to add a network resource identifier to a block list; and FIG. 2D is a flow diagram that illustrates a high level overview of one embodiment of transferring a block list to a messaging gateway and using the block list to filter messages.

Referring first to FIG. 2A, section (1), in step 202, the contents of a whitelist of first network resource identifiers are retrieved. In an embodiment, threat information processor 108 creates and manages a URI whitelist. Alternatively, a public URI whitelist can be used. The whitelist of step 202, and the blocklist of step 210 described further below, may be machine-generated or human-generated. For proper performance of later filtering operations, the whitelist and the blocklist should be highly accurate. In this context, "whitelist" refers to a list of network addresses, IP addresses, domain names, or other network resource identifiers that have been generally not associated with spam or threats.

In step 204, a particular first network resource identifier is retrieved from the whitelist.

In step 206, a list of properties or tokens for the retrieved first network resource identifier is generated. In this context, examples of "properties" of a network resource identifier may include: information obtained from DNS queries based on the network resource identifier, such as names, IP addresses, servers, etc.; web pages; server software that the network resource identifiers is using; information obtained from "whois" queries, based on both a domain name owner for a domain name contained in the network resource identifier and a network block owner; and words extracted from the URI and/or domain name (e.g., for the domain name "bluepillorders.com", extracted words could include "blue," "pill," and "orders").

In an embodiment, step 206 comprises retrieving a copy of a web page or other network resource that is identified by the particular network resource identifier. For example, HTTP service 132 of threat information processor 108 creates and issues an HTTP GET request to download the resource at the extracted URL stated above. Assuming that the extracted URL identifies an active, online web site 152 or other network resource 150, a copy of a web page or other resource is received in response to the HTTP GET request.

The properties associated with a network resource identifier are converted into a list or stream of tokens, in which each token is a discrete portion of the properties. For example, tokens may comprise strings, words, text blocks, graphical images, URLs, frames, or other page elements. Converting a copy into tokens may comprise scanning a stored copy and identifying delimiters of various types.

In step 208, a probabilistic filter, represented by training database 218, is trained using the tokens. For example, probabilistic filter 134 is provided the tokens, and information indicating that the tokens are associated with "known good" network resource identifiers. During training, an administrator or other trusted user of threat information processor 108 instructs probabilistic filter 134 about whether a particular network resource and properties are actually associated with spam or message threats. Alternatively, step 208 may involve training a probabilistic filter that is used only to generate the probability that a set of other network resource identifier properties indicates a network resource identifier that is "good" or not associated with spam or message threats.

Steps 210 to 216 inclusive, shown in section (2) of FIG. 2A, correspond to steps 202 to 208, but steps 210 to 216 train the probabilistic filter (e.g., training database 218) based on network resource identifiers that appear in a blocklist of second network resource identifiers. For example, URIs that appear in blocklist 140 may be used for training in steps 210 to 216. Sections (1) and (2) of FIG. 2A can be run independently, but both can train the same training database or probabilistic filter. As a result, the probabilistic filter is trained to accurately generate a probability that another network resource identifier obtained later is likely to be associated with spam or message threats.

Thus, unlike prior approaches, a probabilistic filter is trained on the content of network resources that appear in blocklists and whitelists and that could be referenced in messages, rather than on words appearing in the message headers or body. As a result, the probabilistic filter 134 acquires stored information that indicates the probability that particular text, images, graphics, or other document elements appearing in network resources are referenced in spam messages or network resources that contain or deliver computer-based threats.

Consequently, when a new message is later received but contains a different URL that points to similar content on which the probabilistic filter has been trained, the probabilistic filter will correctly identify the new message as spam or associated with a threat. This approach is highly useful because spam senders of spam may change their domain names rapidly, but not the content delivered by their domains. Therefore, the probabilistic analysis of content proposed herein allows a system to determine how likely a non-blacklisted URL is to be associated with spam or a threat.

In another embodiment, within the probabilistic filter, probability values are stored in association with both network resource identifiers and information identifying tokens or other content elements of the network resources referenced in messages. In this approach, subsequent testing or filtering can involve presenting only a network resource identifier to the probabilistic filter and receiving a corresponding probability value indicating whether that network resource identifier is associated with spam or threats. As a result, each subsequent test or filter does not necessarily require retrieving another copy of the network resource.

Further, since the probabilistic filter 134 is trained based upon the content of network resources that are referenced in a message, rather than the message itself, the probabilistic filter is less likely to fail at filtering messages that have innocuous text but contain embedded hyperlinks that deliver "phishing" attacks or threats.

Steps 202-208 may be repeated for any number of network resource identifiers that appear in a whitelist. Similarly, steps 210-216 may be repeated for any number of network resource identifiers that appear in a blocklist.

Referring now to FIG. 2B, in step 210, information is received relating to a third network resource identifier. In an embodiment, in step 210 the threat information processor 108 receives a communication from messaging gateway 107 indicating that the messaging gateway received one or more messages containing a particular network resource identifier. For example, the communication may occur through a DNS query to a server that is maintained at threat information processor 108. Additionally or alternatively, threat information processor 108 is linked to messaging gateway 107 under a "SenderBase Network Participation" protocol by which the messaging gateway can periodically report data that the messaging gateway processed.

Alternatively, step 210 may involve actually receiving a message that contains one or more network resource identifiers. Assume, for purposes of illustrating a clear example, that the body of a received message contains the text shown in Table 1.

Table 1

Example Received Message

To provide you with the best possible service, we at Online Payment Services need you to verify your account information with us. If you do not verify your account information, then we will disable your account. To provide your account details, please click here: http://onlinepayment.phishingscam.com Thank you!

Despite the appearance of the message, the message is not authorized by Online Payment Services, and the URL in the message (http://onlinepayment.phishingscam.com) accesses a server that collects user account data for fraudulent or malicious purposes. For purposes of illustrating a clear example, the message of Table 1 includes one URL, but any number of messages each containing any number of URLs or other network resource identifiers may be used in the approach described herein.

Step 210 is typically performed at some time after the probabilistic filter 134 is trained. Thus, FIG. 2B assumes that a probabilistic filter has been trained with probabilities that the content of network resources referenced in a message is spam or associated with threats.

In step 211, a list of properties is generated for the third network resource identifier. The properties may comprise tokens based on the same type of information described above for step 206.

In step 212, the properties of the third network resource identifier are tested using the trained probabilistic filter, and in step 214 a probability output value is received.

In step 216, the probability value is tested to determine whether it is greater than a threshold value indicating spam or a threat. If the received probability is greater than the threshold, then in step 218 the third network resource identifier is added to a block list. In an embodiment, to prevent "feedback loop" effects, step 218 involves adding the network resource identifier to a blocklist other than the blocklist that is used for training in steps 210-216 of FIG. 2A. Any of a separate local blocklist, blocklist 142 or a private blacklist in database 112 may be used. Later, when the block list is sent to messaging gateway 107, the messaging gateway can block delivery of messages that contain the same network resource identifier, as described further below for FIG. 2D.

Step 218 can involve reporting to external information services, such as threat information source 104 or blocklist 140, that the network resource identifier is associated with spam or threats.

The properties that are processed in FIG. 2A, FIG. 2B can include reputation-based information. Referring now to FIG. 2C, in one approach, when the third network resource identifier is received at step 217, a domain name portion of the third network resource identifier is extracted at step 219. If the network resource identifier is "http://onlinepayment. phishingscam.com," then in step 219 the domain name portion "phishingscam.com" is extracted.

In step 220, MX or NS records for the domain name are retrieved from the DNS system. For example, network identifier analysis logic 130 of threat information processor 108 issues a DNS query to DNS server 160 to obtain MX records for the extracted domain name. As shown in FIG. 3, a DNS server 160 stores sets of MX records 162, sets of NS records 164, and sets of A records 166. A particular domain name may be found among none, one, two, or all three types of records. All valid registered domain names have at least an A record that maps an associated IP address. Domains that manage mail exchanges or mail servers will have MX records. Domains that manage name servers will have NS records.

DNS server 160 returns copies of the MX record or a response indicating that no MX records were found. If no MX records are found, then A (address) records for the domain name are requested. Alternatively, name server (NS) records are requested.

The received MX records and NS records identify server names. At step 222, for each received record, an address record is retrieved. For example, another DNS query is issued to obtain an A record for the name given in each MX record or NS record. As a result, threat information processor 108 acquires a network address (such as an IP address) associated with the extracted domain name portion.

In step 224, a reputation score or blocklist status associated with each address in an address record is determined. In an embodiment, a query containing an IP address from an address record is issued to reputation score service 136, which replies with a reputation score value associated with that IP address. Multiple queries for multiple IP addresses associated with a domain may be sent. Multiple queries for multiple IP addresses associated with all of a plurality of domains referenced in the same message may be sent. Resulting reputation score values may be combined, for example, by computing an average. Alternatively, step 224 involves checking the address against a blocklist.

If the average reputation score is below a particular threshold, or if the address is blocked, as tested at step 226, then in step 228 the network resource identifier is added to the block list. As with step 219, a separate block list may be used to prevent feedback effects. Alternatively, control returns at step 230 for other message processing or action.

Thus, the approach of FIG. 2C enables integrating information obtained from a reputation service into determining whether a particular message is probably spam or associated with threats, based on reputation values associated with network resource identifiers found in the message.

A messaging gateway 107 or mail server may use the information developed in the preceding approaches to filter, block, or apply policy to messages that are spam or associated with threats, based on referenced network resource identifiers. Referring now to FIG. 2D, in step 240, a query is received from a messaging gateway for an updated block list. Thus, in one embodiment, messaging gateway 107 periodically queries threat information processor 108 about whether an updated block list is available. In step 242, an updated block list is sent to the messaging gateway. Step 242 may involve creating a block list based on the contents of database 112 and/or blocklist 142.

In step 244, the updated block list is locally stored. For example, messaging gateway 107 stores local blacklist 117 based on the received updated block list.

In step 246, a new email message containing network resource identifiers is received, for example, at messaging gateway 107. The message is provided to anti-spam logic 119. One or more network resource identifiers are extracted from the message at step 248. The anti-spam logic 119 may perform the extracting. At step 250, a test is performed to determine whether the extracted network resource identifiers are found in the block list.

If so, then in step 252 the messaging gateway 107 modifies a threat score value based on the true result of test 250. Thus, when FIG. 2D is implemented in the context of anti-spam scanning, step 252 may involve increasing a spam score value to indicate that the message of step 246 is likely "spammy."

If the extracted network resource identifiers are not found in the block list, then in step 254 the messaging gateway 107 can perform other message processing, such as anti-virus scanning, content filtering, policy enforcement, etc.

2.3 Plug-in Embodiment

In one embodiment, the approaches herein are implemented in a software plug-in for anti-spam logic 119 in messaging gateway 107. In general, such a local URI Blocklist plug-in uses data extracted from messages using anti-spam logic 119 to find network resource identifiers in messages and test them against a URI blocklist.

In an embodiment, the plug-in returns one positive result per message based on searching the message body for network resource identifiers. Additionally or alternatively, positive and negative result values can be created for all network resource identifiers found in a message.

In one embodiment, the plug-in supports writing rules to specify the source list(s) that should be positive and their scoring weight. The rules enable an administrator or other user of messaging gateway 107 to specify a bitmask referring to the list or lists to test against. With this approach, extra scoring weight can be placed on specific lists or sources that are known to be especially reliable or not.

Testing can be performed against blocklist 140, blocklist 142, or another blocklist that is stored locally within messaging gateway 107. Thus, for purposes of FIG. 1 the local blacklist 117 can represent such a local blocklist. The blocklist may be stored in local database or file, which allows Perl scripts and Python programs to connect to the file and treat the file as containing hash values. In one embodiment, entries in the local database or file comprise a (key->value) combination, where each key is a domain value and each associated value is a source bitmask. For example, an entry may comprise (foo.bar=>0.0.68), wherein "0.0.68" is a bitmask representing IronPort, a third-party blocklist, etc.

2.4 Red List Embodiment

In one embodiment, network identifier analysis logic 130 is configured to create, in database 112, information about "disreputable" URIs, host names, and domain names to supplement the use of public URI blocklist 140 in spam prevention and threat prevention. The network identifier analysis logic 130 creates information in database 112 using data feeds from multiple sources, such as other information in the database, log files that are generated by virus information logic 114 or anti-spam logic 119 and sent to the threat information processor 108, etc. In this arrangement, network identifier analysis logic 130 can capture and identify spammer URIs and hostnames as quickly as possible after they are first used.

In an embodiment, the network identifier analysis logic 130 is denoted a RedList application and is hosted in a messaging gateway 107, such as one of the C-Series Messaging Gateway Appliance products available at the time of this writing from IronPort Systems, Inc., San Bruno, Calif. The RedList application determines the "respectability" of a host domain based on the respectability of its associated domains, such as those domains providing name service and mail service, based on the rationale that it is usually much cheaper (or more efficient) for spammers to create new domains than it is to set up new name servers and/or mail servers. Further, the RedList application assumes that spammers tend to be associated in domains; a single name server or mail server may host many different spammer domains.

In an embodiment, the RedList application extracts the host name and domain name from the URLs found in a spam email message and looks up information for associated domains based on NS and MX records. This approach can effectively tie a URI domain into a spammer's infrastructure. The RedList application can determine the reputation of the extracted host name or domain name based on the reputation of its nearest associates.

The output from the RedList application can be merged into an existing blocklist file that is used by existing anti-spam, anti-threat, or other message scanning applications or engines.

In an embodiment, the RedList application is hosted on a dedicated computer in the threat information processor 108. Multiple computers that host the RedList application can be used for redundancy and to provide faster access to reputation score service 136 and faster access for DNS lookups. In one embodiment, a computer that hosts the RedList application comprises:

1) A MySQL database that stores found URIs and hostnames.

2) Multiple processes to parse URIs and hostnames supplied from multiple sources.

3) A generic input file parser and loader that will read input files from the parsers and load the data into the MySQL database.

4) A process that performs name lookups (A, NS and MX) on a list of hostnames from the SQL database and stores found information in the database.

5) A process that looks up IP address information, previously found for hostnames in the database, against the reputation score service 136.

6) A process that creates an output file suitable for folding into the local blocklist 117 of a messaging gateway 107.

Tables in the database represent: domains, domain NSIPs, NSIPs, and sources.

In an embodiment, multiple parsers can provide URI/hostname data from multiple data sources. In an embodiment, each parser provides its data in a generic format. The parser output files will consist of key-value pairs, separated by white space. Example keys and values include: source=<where this came from, i.e. sbnp, surbl>; uri=<uri with white space encoded>.

The input file parser reads information formatted in a generic log file format, provided by various source parsers, and inserts the data into the database 112. When inserting the data into the database 112 the parser makes a general data integrity check. If the data integrity check fails, then the parser discards the failed input line.

The name lookups are performed using external DNS servers. In an embodiment, incoming URLs are broken into two parts denoted <firstpart>.<domain>, where <domain> is determined using the registrar boundary code from Apache SpamAssassin. If all of <firstpart> is a standard or "well-known" hostname (for example, "www", "ftp", "www1", etc.) then the name is looked up in DNS A, NS, MX for <firstpart>.<domain>.

In an embodiment, the logic avoids directly looking up "random"<firstpart> hostnames that are not www or other well known names. This constraint is observed in case spammers are using the hostnames as a tracking mechanism, and prevents the system from exposing spam traps by triggering a tracking identifier. Instead, the logic creates its own random hostname and looks up that hostname instead. In an embodiment, the following is looked up in DNS: A, NS, MX for <domain>; A, NS, MX for www.<domain>; A, NS, MX for <randomhost>.<domain>.

For each NS and MX hostname found by the lookups above, the returned hostnames are added to the database 112 to permit performing another (recursive) lookup. If the <firstpart> is an IP address, then the following lookups are performed: none, the IP itself (in other words, the IP is an A record); PTR reverse DNS; forward DNS for PTR; if the domain of the PTR and the forward of the PTR are identical, then the forward DNS hostname is treated as a standard hostname except that the host is considered to *not* be "a tracking mechanism.

Hostnames added via a lookup (ie NS and MX records) are not subject to filtering for random hostnames.

In an embodiment, a local DNS cache is implemented to improve performance because a large number of DNS resolutions will be made over time. In an embodiment, the local DNS cache is an in-memory cache. The cache stores entries for a period of the lesser of time to live or one hour. The cache uses available memory on the RedList application servers. When running in multi-machine mode, the cache allows the RedList servers to share DNS information.

In an embodiment, once the RedList application has IP addresses for specific hostnames and their NS/MX records, the RedList application looks up the hostnames using the reputation score service 136 and stores the results.

Output from the RedList application is periodically communicated to a messaging gateway 107 for merging into the local blocklist 117. Hostnames or domains that exist on the public URI blocklist 140 or in another whitelist are not included in the output file. In one embodiment, any hostnames meeting the following criteria are included in the output file. Hostnames are included if, for all associated NS records: If the A record (IP) exists in a blacklist database maintained by reputation score service 136 and its reputation score is <0; If the A record (IP) has a reputation score lower than −1.

In one embodiment, the RedList application implements rapid rules for full-URLs, particularly for sites that can't be blacklisted, but are used by spammers (e.g. redirectors and free hosting sites such as Geocities). The rules may also include "format" rules for situations in which software zombies might all have similar formats, but different URLs.

In an embodiment, the RedList application implements a scheduler to schedule URLs in other processes, for example, to check new ones first, only recheck as requested, etc. In an embodiment, the RedList application can reference the exact message that a URI was extracted from. In an embodiment, other data sources can be used. For example, complaint information from the SpamCop service, available at the time of this writing at the domain spamcop.net on the World Wide Web, can be provided to the RedList application.

In an embodiment, the RedList application receives data streams directly from one or more domain registrars. The data streams consist of domain names and the name servers for those domains; the data is similar to the data that the registrars send to the custodians of the root name servers. When new data arrives in one of the data streams, a parser is launched to import the data. The parser(s) will handle their respective file formats, handing domains and their respective name servers to a broker object that stores the information, as well as some meta-information in the database 112. The meta information may comprise: A time stamp indicating the first time the system receives information about a particular domain; a time stamp indicating the most recent time the domain has been seen, for use in purging expired domains from the database 112; and a time stamp indicating the last time a change of name servers occurred.

Information about new domains, received direct from a domain name registrar, is believed to be highly probative of spam, because the inventor has observed a high correlation between recently-registered domains and sources of spam. The inventor also has recognized that domains associated with spam may change their name servers near the time a mailing in that domain is started. For this reason, an embodiment can provide a list covering different period lengths listing new domains and changed NS records from the registrar feeds.

In an embodiment, the RedList application maintains an internal domain whitelist. While the RedList application can use one or more external whitelists to avoid adding the domains of known, legitimate businesses to the database 112 as blocked or low-reputation domains, using an internal whitelist enables the RedList application to define and enforce its own list of "legitimate" domains that should never be listed by the automated processes within the RedList application. The internal whitelist can be combined with the file-based whitelists from outside sources.

In an embodiment, a web interface enables authorized users to add, edit and delete domain entries to the internal whitelist. Adding and editing is subject to basic validation to make sure the domains being entered are valid. Deletion may require a validation step. Deletion may also have a check-box labeled "Queue for checking?", or the equivalent, that will allow whitelist maintainers to cause a domain to be immediately re-checked if it has fallen out of favor.

The internal whitelist may be used to compliment existing file-based whitelists. For example, in one use case, the domain of a legitimate business appears in the RedList. An analyst adds the domain to the whitelist via the web interface. The next time that output from the RedList application is published, it will not contain this domain. In another use case, a domain is removed from the whitelist. The "www host" of the domain is added to the queue for evaluation. If the scores warrant, this domain will appear in the next published output.

In an embodiment, service level monitoring may be implemented. Service level monitoring may involve monitoring the output information that the RedList application generates. For example, a delta monitor can watch the output files from the RedList application, counting the number of lines every few minutes. If a change of more than 10% is detected between checks, an alarm may be raised and remain critical until acknowledged. As another example, a registrar feed monitor can be implemented in which file time stamps are monitored on the incoming registrar feed files and cause an alarm if they are more than 25% late, based on frequency (for example, a daily source will alarm if not updated after 24+6 hours). Other metrics may be monitored, such as RedList output size, input file queue size, NS Lookup queue size, reputation score service lookup queue size, etc.

In an embodiment, the RedList application aggregates URLs that have randomized or non-normal hostnames into a single specially marked entry in database 112. This approach enables the RedList application to track certain information about randomized domains. The information may be tracked in another table, linked back to the special host entry. In this approach, the RedList application can identify information about domains that have many of random hostnames, or sudden spikes in activity.

In another embodiment, the RedList application counts the imported data and watches for spikes in traffic for domains.

In an embodiment, the RedList application can identify unregistered domains that have a poor reputation. For example, the RedList application detects volume spikes in spamtraps for domains not appearing in registrar databases.

In an embodiment, the RedList application keeps track of the first appearance in the domain registry system of top-level domains for which the system does not have registrar feeds, and publishes information about the new domains as a new rule for use by messaging gateway 107 in anti-spam logic 119.

In an embodiment, the RedList application maintains an NS whitelist. For example, the RedList application tracks NS records for whitelisted domains, and those name servers are considered to have a good reputation, even if the name servers have been blacklisted by an external block list.

3.0 Implementation Mechanisms

Hardware Overview

Figure 4:
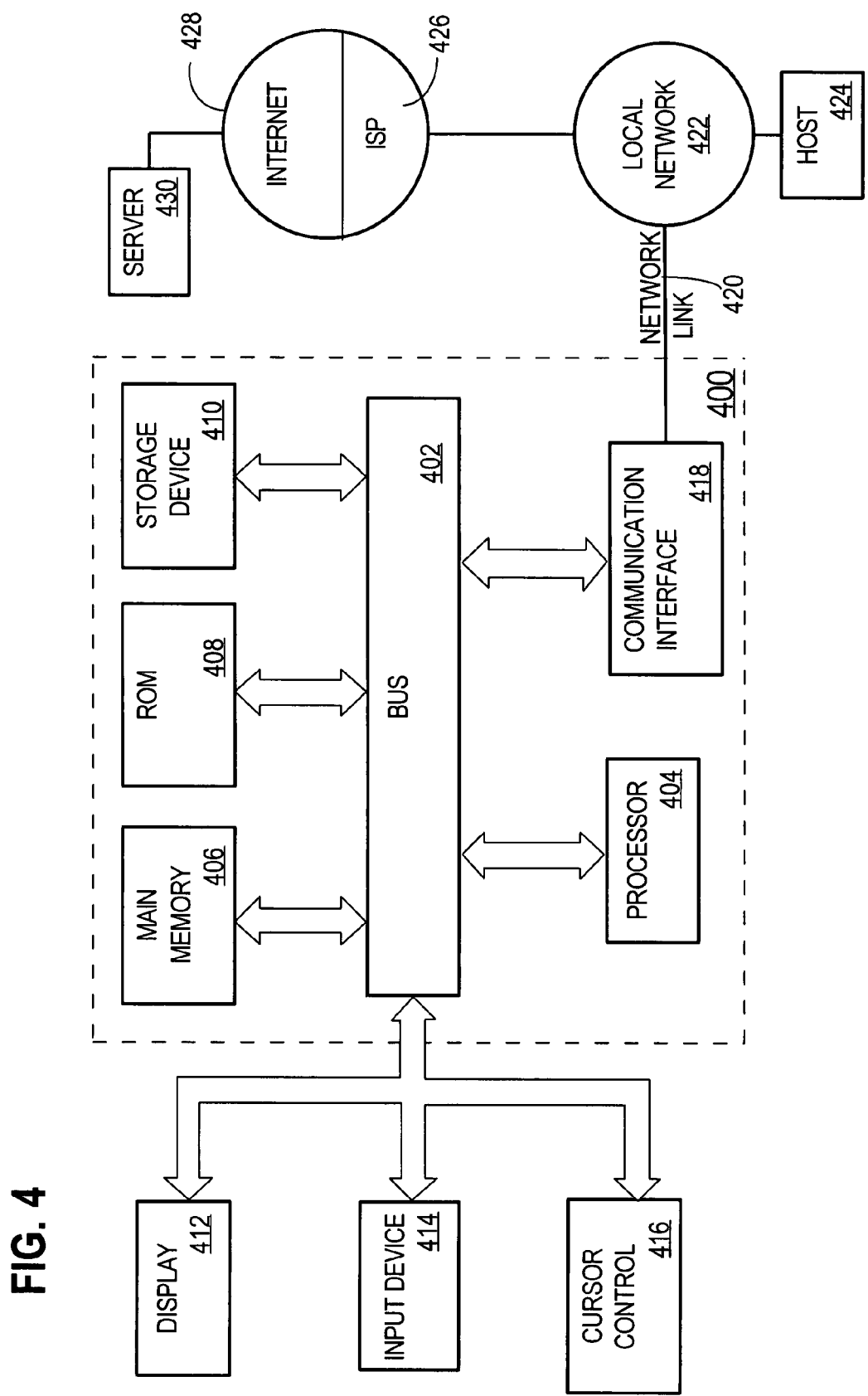
FIG. 4 is a block diagram that illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for detecting unwanted electronic mail messages based on probabilistic analysis of referenced resources. According to one embodiment of the invention, detecting unwanted electronic mail messages based on probabilistic analysis of referenced resources is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for detecting unwanted electronic mail messages based on probabilistic analysis of referenced resources as described herein.

The received code may be executed by processor 404 as it is received, and/or stored in storage device 410, or other non-volatile storage for later execution. In this manner, computer system 400 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A data processing system, comprising:
one or more processors;
logic encoded in one or more media for execution and when executed operable to cause the one or more processors to perform:
training a probabilistic filter using first properties of one or more first network resource identifiers obtained from a whitelist;
wherein at least one of the first properties is obtained from any of:
information obtained from DNS queries based, at least in part, on the one or more first work resource identifiers;
server software information; or
information obtained from "whois" queries based, at least in part, on information contained in the network resource identifier;
training the probabilistic filter using second properties of one or more second network resource identifiers obtained from a blocklist;
testing third properties of a third network resource identifier using the probabilistic filter, resulting in creating a probability output;
adding the third network resource identifier to the blocklist when the probability output is greater than a specified threshold.

2. The invention of claim 1, wherein the whitelist comprises network resource identifiers that are not associated with spam or threats, and wherein the blocklist comprises network resource identifiers that are associated with spam or threats.

3. The invention of claim 1, wherein the specified threshold indicates spam or threats.

4. The invention of claim 1, wherein the training comprises generating lists of one or more of the properties from the network resource identifiers.

5. The invention of claim 1, wherein the logic when executed is further operable to perform:
extracting a domain name portion of the third network resource identifier;
retrieving one or more MX records for the domain name portion from a domain name system (DNS) server;
retrieving network address records for each mail exchange that is identified in the one or more MX records;
determining an average reputation score for the network address records;
adding the third network resource identifier to the blocklist when the average reputation score is less than a specified threshold.

6. The invention of claim 5, wherein the logic when executed is further operable to perform determining a blocklist status for the network address records, and adding the third network resource identifier to the blocklist when the blocklist status indicates that network addresses in the network address records are blocked.

7. The invention of claim 1, wherein the logic when executed is further operable to perform
extracting a domain name portion of the third network resource identifier;
retrieving one or more NS records for the domain name portion from a domain name system (DNS) server;
retrieving network address records for each mail exchange that is identified in the one or more NS records;
determining an average reputation score for the network address records;
adding the third network resource identifier to the blocklist when the average reputation score is less than a specified threshold.

8. The invention of claim 7, wherein the logic when executed is further operable to perform determining a blocklist status for the network address records, and adding the third network resource identifier to the blocklist when the blocklist status indicates that network addresses in the network address records are blocked.

9. The invention of claim 1, wherein the logic when executed is further operable to communicate the blocklist to one or more messaging gateways over a data network.

10. The invention of claim 1, further comprising:
one or more messaging gateways coupled to the processor over a data network;
wherein the logic when executed is further operable to communicate the blocklist to the one or more messaging gateways over the data network;
in each of the one or more messaging gateways, second logic encoded in one or more media for execution and when executed operable to perform:
receiving a message containing one or more hyperlinks or network resource identifiers;
searching the received blocklist to determine whether the one or more hyperlinks or network resource identifiers are in the blocklist;
modifying a spam score value of the message based on whether the one or more hyperlinks or network resource identifiers are in the blocklist.

11. A data processing system, comprising:
means for training a probabilistic filter using first properties of one or more first network resource identifiers obtained from a whitelist;
wherein at least one of the first properties is obtained from any of:
information obtained from DNS queries based, at least in part, on the one or more first work resource identifiers;
server software information; or
information obtained from "whois" queries based, at least in part, on information contained in the network resource identifier;
means for training the probabilistic filter using second properties of one or more second network resource identifiers obtained from a blocklist;
means for testing third properties of a third network resource identifier using the probabilistic filter, resulting in creating a probability output;
means for adding the third network resource identifier to the blocklist when the probability output is greater than a specified threshold.

12. The invention of claim 11, wherein the whitelist comprises network resource identifiers that are not associated with spam or threats, and wherein the blocklist comprises network resource identifiers that are associated with spam or threats.

13. The invention of claim 11, further comprising:
means for extracting a domain name portion of the third network resource identifier;
means for retrieving one or more MX records for the domain name portion from a domain name system (DNS) server;
means for retrieving network address records for each mail exchange that is identified in the one or more MX records;

means for determining an average reputation score for the network address records;
means for adding the third network resource identifier to the blocklist when the average reputation score is less than a specified threshold.

14. The invention of claim 13, further comprising means for determining a blocklist status for the network address records, and adding the third network resource identifier to the blocklist when the blocklist status indicates that network addresses in the network address records are blocked.

15. The invention of claim 11, further comprising:
means for extracting a domain name portion of the third network resource identifier;
means for retrieving one or more NS records for the domain name portion from a domain name system (DNS) server;
means for retrieving network address records for each mail exchange that is identified in the one or more NS records;
means for determining an average reputation score for the network address records;
means for adding the third network resource identifier to the blocklist when the average reputation score is less than a specified threshold.

16. The invention of claim 15, further comprising means for determining a blocklist status for the network address records, and adding the third network resource identifier to the blocklist when the blocklist status indicates that network addresses in the network address records are blocked.

17. The invention of claim 11, further comprising means for communicating the blocklist to one or more messaging gateways over a data network.

18. The invention of claim 11, further comprising:
one or more messaging gateways coupled to the processor over a data network;
means for communicating the blocklist to the one or more messaging gateways over the data network;
means for receiving a message containing one or more hyperlinks or network resource identifiers;
means for searching the received blocklist to determine whether the one or more hyperlinks or network resource identifiers are in the blocklist;
means for modifying a spam score value of the message based on whether the one or more hyperlinks or network resource identifiers are in the blocklist.

19. A computer-implemented method of evaluating an electronic mail message based on probabilistic analysis, comprising:
training a probabilistic filter using first properties of one or more first network resource identifiers obtained from a whitelist;
wherein at least one of the first properties is obtained from any of:
information obtained from DNS queries based, at least in part, on the one or more first work resource identifiers;
server software information; or
information obtained from "whois" queries based, at least in part, on information contained in the network resource identifier;
training the probabilistic filter using second properties of one or more second network resource identifiers obtained from a blocklist;
testing third properties of a third network resource identifier using the probabilistic filter, resulting in creating a probability output;
adding the third network resource identifier to the blocklist when the probability output is greater than a specified threshold.

20. The invention of claim 19, wherein the whitelist comprises network resource identifiers that are not associated with spam or threats, and wherein the blocklist comprises network resource identifiers that are associated with spam or threats.

21. The invention of claim 19, further comprising:
extracting a domain name portion of the third network resource identifier;
retrieving one or more MX records for the domain name portion from a domain name system (DNS) server;
retrieving network address records for each mail exchange that is identified in the one or more MX records;
determining an average reputation score for the network address records;
adding the third network resource identifier to the blocklist when the average reputation score is less than a specified threshold.

22. The invention of claim 21, further comprising determining a blocklist status for the network address records, and adding the third network resource identifier to the blocklist when the blocklist status indicates that network addresses in the network address records are blocked.

23. The invention of claim 19, further comprising:
extracting a domain name portion of the third network resource identifier;
retrieving one or more NS records for the domain name portion from a domain name system (DNS) server;
retrieving network address records for each mail exchange that is identified in the one or more NS records;
determining an average reputation score for the network address records;
adding the third network resource identifier to the blocklist when the average reputation score is less than a specified threshold.

24. The invention of claim 23, further comprising determining a blocklist status for the network address records, and adding the third network resource identifier to the blocklist when the blocklist status indicates that network addresses in the network address records are blocked.

25. A non-transitory computer-readable tangible storage medium storing one or more sequences of instructions which, when executed by one or more processors, cause the one or more processors to perform the steps of:
training a probabilistic filter using first properties of one or more first network resource identifiers obtained from a whitelist;
wherein at least one of the first properties is obtained from any of:
information obtained from DNS queries based, at least in part, on the one or more first work resource identifiers;
server software information; or
information obtained from "whois" queries based, at least in part, on information contained in the network resource identifier;
training the probabilistic filter using second properties of one or more second network resource identifiers obtained from a blocklist;
testing third properties of a third network resource identifier using the probabilistic filter, resulting in creating a probability output;
adding the third network resource identifier to the blocklist when the probability output is greater than a specified threshold.

26. The invention of claim 25, wherein the whitelist comprises network resource identifiers that are not associated with spam or threats, and wherein the blocklist comprises network resource identifiers that are associated with spam or threats.

27. The invention of claim 25, wherein the logic when executed is further operable to perform:
- extracting a domain name portion of the third network resource identifier;
- retrieving one or more MX records for the domain name portion from a domain name system (DNS) server;
- retrieving network address records for each mail exchange that is identified in the one or more MX records;
- determining an average reputation score for the network address records;
- adding the third network resource identifier to the blocklist when the average reputation score is less than a specified threshold.

28. The invention of claim 27, wherein the logic when executed is further operable to perform determining a blocklist status for the network address records, and adding the third network resource identifier to the blocklist when the blocklist status indicates that network addresses in the network address records are blocked.

29. The invention of claim 1, wherein the instructions for adding comprise instructions for adding the third network resource identifier to a blocklist other than the blocklist.

30. The invention of claim 11, wherein the means for adding comprises adding the third network resource identifier to a blocklist other than the blocklist.

31. The invention of claim 19, wherein the step of adding comprises adding the third network resource identifier to a blocklist other than the blocklist.

32. The invention of claim 25, wherein the logic for adding comprises logic for adding the third network resource identifier to a blocklist other than said blocklist.

* * * * *